Figure 1:
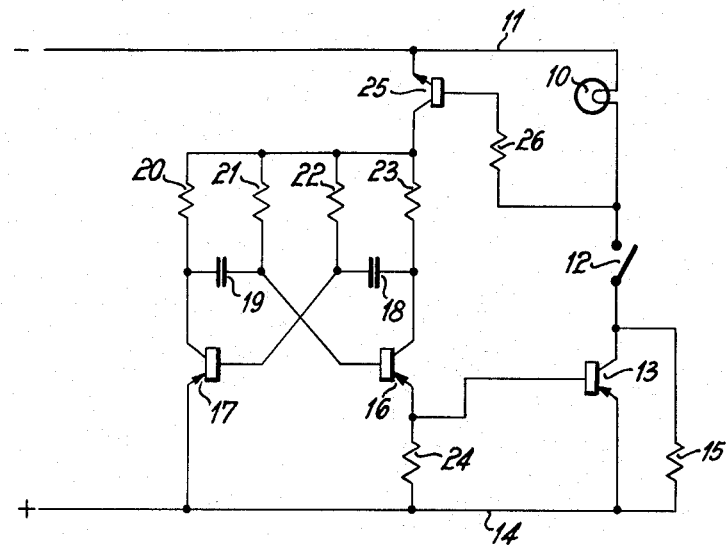

July 26, 1966          H. SCHOLL          3,263,119
BLINKING LIGHT ARRANGEMENT
Filed Nov. 6, 1963

INVENTOR
Hermann Scholl
by
Michael J. Striker
Atty.

United States Patent Office 3,263,119
Patented July 26, 1966

1

3,263,119
BLINKING LIGHT ARRANGEMENT
Hermann Scholl, Stuttgart, Germany, assignor to
Robert Bosch G.m.b.H., Stuttgart, Germany
Filed Nov. 6, 1963, Ser. No. 321,864
Claims priority, application Germany, Nov. 21, 1962,
B 69,706
5 Claims. (Cl. 315—77)

The invention concerns a blinking light arrangement, particularly suitable for the operation of turn indicators on motor vehicles. The invention especially concerns a circuit arrangement of this type which contains in the supply circuit for the respective lamps or lights a switching transistor which is alternatingly changed between conductive and non-conductive condition by the operation of an astable multivibrator.

Conventional blinking light arrangements of this type are always subject to the danger that the switching transistor is damaged by the current peak developing upon switching on the lamps because of the low cold resistance of the lamps. Also, in conventional arrangements there is no protection against overload of the switching transistor in case that a short circuit should develop in the circuit arrangement containing the lamps.

It is therefore one object of this invention to provide for a blinking light arrangement in which the switching transistor is protected against destruction by any kind of overload.

It is another object of this invention to provide for an arrangement of the type set forth which is comparatively simple in structure and entirely reliable in operation.

With above objects in view the invention includes a blinking light arrangement, particularly for turn indicators on motor vehicles, comprising, in combination, electric lamp means; circuit means connected between a source of electric energy and said lamp means and including control transistor means changeable between conductive and non-conductive condition for closing and interrupting the current supply to said lamp means depending upon said conditions; astable multivibrator means connected with said circuit means and cooperating with said control transistor means for periodically changing the latter between said conductive and non-conductive conditions; and protective transistor means connected in said circuit means between one terminal of said source and said multivibrator means and also in parallel with said lamp means for remaining conductive only as long as the current flow through the circuit entering said lamp means remains in a predetermined normal range, but interrupting said circuit means when said current flow across said circuit increases beyond a predetermined maximum.

Figure 2:
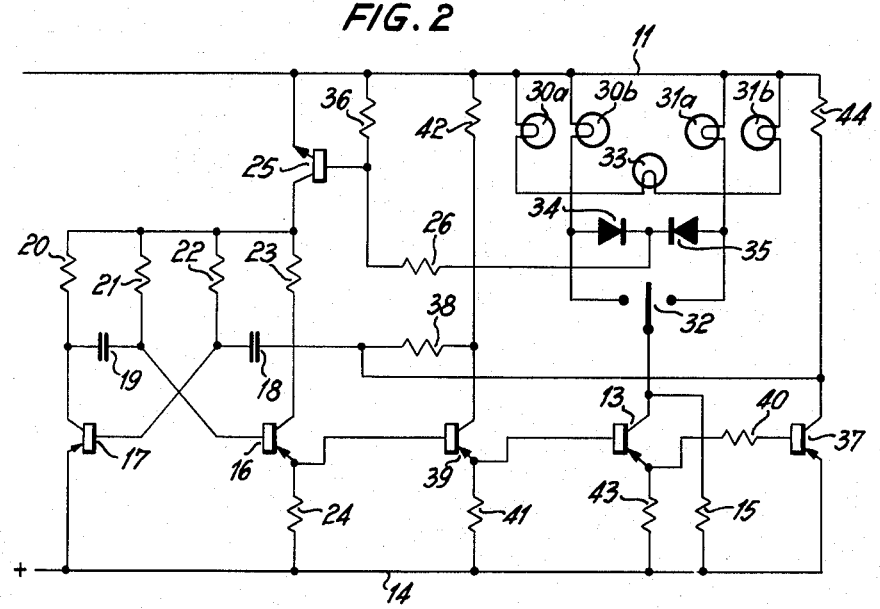

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a schematic circuit diagram illustrating one embodiment of the invention; and FIG. 2 is a schematic circuit diagram for a further developed embodiment of the invention, particularly suited for the turn indicator arrangements on motor vehicles.

The blinking light arrangement according to FIG. 1 comprises a blinking light or lamp 10 which is connected at one side with a supply line 11 which leads to the negative terminal of a source of electric energy, while the other side of the lamp 10 is connected via a conventional switch

2

12 and via the emitter-collector circuit of a switching transistor 13 with the supply line 14 taken to the positive terminal of the above-mentioned source of energy. The emitter-collector circuit of the transistor 13 is shunted by a resistor 15 of about 5 ohms.

In order to change periodically the switching transistor 13 between conductive and non-conductive condition its base is connected with a conventional astable multivibrator circuit, and more particularly in this embodiment with the emitter of a transistor 16 forming part of said multivibrator. The multivibrator arrangement comprises further a transistor 17, two coupling condensers 18 and 19, and four charging and discharging resistors, respectively, marked 20, 21, 22 and 23, in conventional connections. The emitter of the transistor 16 is connected via a resistor 24 to the positive supply line 14. All the transistors 13, 16 and 17 may be of the PNP-type. The outer ends of the resistors 20-23 are jointly connected to the emitter-collector circuit of a protective transistor 25 and through this emitter-collector circuit with the negative supply line 11. In this embodiment the protective transistor 25 would be of the NPN-type. The base electrode of the transistor 25 is connected via a resistor 26 with that side of the lamp 10 which is connected with the switch 12. Thus it can be seen that the emitter-base circuit of the protective transistor 25 is connected in parallel with the lamp 10.

The arrangement according to FIG. 1 operates in the following manner. As long as the switch 12 is in open position all the transistors of the arrangement are in non-conductive condition. Thus no current is consumed by the arrangement. However, when the switch 12 is moved to closed position then first a comparatively weak current flows via the resistor 15 and through the lamp 10 so that the latter is started to be heated. Hereby the resistance thereof gradually increases and consequently the potential at the junction point between the lamp 10 and the resistor 15 becomes therefore more positive. When a certain predetermined potential is reached a base current starts to flow through the protective transistor 25 so that the latter becomes conductive. When this takes place the full operative voltage existing between the supply lines 11 and 14 is applied to the astable multivibrator so that the latter starts to operate. Consequently, the switching transistor 13 whose base is connected with the emitter of the transistor 16 is rendered conductive periodically in synchronism with the transistor 16. When the transistor 13 is in conductive condition the resistor 15 is short-circuited or shunted whereby the full operative voltage existing between the lines 11 and 14 is applied to the lamp 10 so that the latter blinks at the frequency of the multivibrator which is predetermined in a conventional manner.

Should for any reason a short-circuit develop in the lamp 10 or in the pertaining circuit portion then the potential at the base of the protective transistor 25 would immediately drop to substantially the potential of the negative supply line 11. When this occurs the protective transistor 25 is changed to non-conductive condition so that hereby the circuit for the multivibrator is interrupted and all the other transistors are cut off from energy supply. Consequently, in such case the switching transistor 13 is fully protected against overload by an excessive current that would result from the above mentioned short-circuit in the lamp circuit.

The second embodiment of the invention according to FIG. 2 is more elaborate and particularly suited for being used in connection with a conventional turn indicator light arrangement on a motor vehicle. As far as the components of the arrangement according to FIG. 2 are identical with those described above in reference to FIG. 1, the same numerals are used.

The arrangement according to FIG. 2 comprises as is conventional for motor vehicles two groups of signal lamps 30a, 30b and 31a, 31b, each group arranged in a separate or individual lamp circuit between the negative supply line 11 and a corresponding alternative stationary contact of the selector switch 32 which can be actuated selectively but otherwise operates for each lamp group exactly like the single switch 12 in FIG. 1. As is well known, moving the switch 32 into one position energizes the one lamp group for indicating a turn to the left, while moving the switch 32 into the opposite position energizes the other lamp group for indicating a turn to the right. In conventional manner an indicator light 33 is connected between the two lamp circuits, this lamp 33 having a substantially greater resistance and smaller current consumption than any of the lamp groups so that it will be caused to blink in synchronism with any one of the energized lamp groups. The base of the protective transistor 25 is connected via resistor 26 and across the diodes 34 and 35 with the above mentioned stationary contacts of the switch 32 and thus with the individual lamp circuits. It can be seen that again the emitter-base circuit of the protective transistor 25 is connected in parallel with any one of the lamp circuits that may become energized by actuation of the switch 32. The diodes 34 and 35 are arranged in such a manner that current can flow to the base of the transistor 25 only from that one selected lamp circuit which is being energized by corresponding actuation of the switch 32. At the same time, the diodes 34 and 35 prevent more than one of the lamp groups from becoming energized in any particular position of the switch 32.

The base of the protective transistor 25 is additionally connected to the negative supply line 11 across a low resistance resistor 36 so that actually the latter constitutes together with the above mentioned resistor 26 a voltage divider connected in parallel with the lamp circuits while the base of the transistor 25 is connected to a junction point between the resistors 26 and 36. By means of this specific arrangement the operation of the protective transistor is rendered in a well known manner independent of varying temperature conditions.

Otherwise the arrangement according to FIG. 2 differs from that according to FIG. 1 also by supplementary means for increasing the blinking frequency whenever one of the signal lamps 30a, 30b, 31a or 31b should fail and become inoperative.

For this purpose the arrangement comprises two additional transistors 37 and 39 which are not part of the multivibrator. One terminal of the condenser 18 is connected as usual with the base of the multivibrator transistor 17, while its other terminal is connected with the collector of the transistor 37 and additionally via a resistor 38 with the collector of the transistor 39. The transistors 16, 39, 13 and 37 constitute in this case an amplifier chain because the bases of the transistors 39 and 13 are connected directly with the emitter of the respectively neighboring transistor while the base of the transistor 37 is connected via a resistor 40 with the emitter of the neighboring transistor 13. The transistor 39 is supplemented by an emitter resistor 41 and a collector resistor 42 while the transistor 13 is supplemented by an emitter resistor 43 and the transistor 37 is supplemented by a collector resistor 44 as shown in FIG. 2.

The arrangement according to FIG. 2 operates in the following manner. When the blinking arrangement is switched on by moving the selector switch 32 in one or the other circuit-closing position for indicating a certain turn direction either a supply circuit for the lamp group 30a, 30b or for the lamp group 31a, 31b is closed. The result of this is exactly the same performance as that described above in reference to FIG. 1. The only difference is that now all the transistors 39, 13 and 37 are rendered conductive and non-conductive in synchronism with the same change of condition occurring with the transistor 16 of the multivibrator.

However, should any single one of the signal lamps 30a, 30b, 31a or 31b fail or become inoperative, then the voltage drop across the resistor 43 on account of the reduced current consumed by the lamps will not suffice for rendering the transistor 37 fully conductive. Consequently, the potential at that electrode of the capacitor 18 which is connected with the collector of the transistor 37 will not assume during the conductive condition of the transistor 16 that value which exists at the positive supply line 14 but will assume a value which is determined by the voltage dividing ratio of the resistors 38 and 44. Consequently the voltage change at the capacitor 18 becomes substantially smaller which entails an increase of the blinking frequency of the arrangement.

In the case of a short circuit in one of the lamp circuits the blinking arrangement according to FIG. 2 functions exactly in the same manner as described above with reference to FIG. 1 because the protective transistor 25 is also rendered non-conductive in such case whereby again all the other transistors of the entire arrangement are rendered non-conductive.

It will be understood that each of the elements described above, or two or more together, may also find a useful application in other types of blinking light arrangement differing from the types described above.

While the invention has been illustrated and described as embodied in a blinking light arrangement including protective transistor means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Blinking light arrangement, particularly for turn indicators on motor vehicles, comprising, in combination electric lamp means; circuit means connected between a source of electric energy and said lamp means and including control transistor means changeable between conductive and non-conductive condition for closing and interrupting the current supply to said lamp means depending upon said conditions; astable multivibrator means connected with said circuit means and cooperating with said control transistor means for periodically changing the latter between said conductive and non-conductive conditions; and protective transistor means connected in said circuit means between one terminal of said source and said multivibrator means and also in parallel with said lamp means for remaining conductive only as long as the current flow through the circuit entering said lamp means remains in a predetermined normal range, but interrupting said circuit means when said current flow across said circuit increases beyond a predetermined maximum.

2. Blinking light arrangement, particularly for turn indicators on motor vehicles, comprising, in combination, electric lamp means; circuit means connected between a source of electric energy and said lamp means and including control transistor means changeable between conductive and non-conductive condition for closing and interrupting the current supply to said lamp means depending upon said conditions; astable multivibrator means connected with said circuit means and cooperating with said control transistor means for periodically changing the latter between said conductive and non-conductive conditions; and protective transistor means connected in said circuit means with its emitter-collector circuit between one terminal of said source and said multivibrator means and with its emitter-base circuit in parallel with said lamp means for remaining conductive only as long as the current flow through the circuit entering said lamp means remains in a predetermined normal range, but interrupting said circuit means when said current flow across said circuit increases beyond a predetermined maximum.

3. Blinking light arrangement, particularly for turn indicators on motor vehicles, comprising, in combination, electric lamp means; circuit means connected between a source of electric energy and said lamp means and including control transistor means changeable between conductive and non-conductive condition for closing and interrupting the current supply to said lamp means depending upon said conditions, and voltage divider means connected in parallel with said lamp means; astable multivibrator means connected with said circuit means and cooperating with said control transistor means for periodically charging the latter between said conductive and non-conductive conditions; and protective transistor means connected in said circuit means with its emitter-collector circuit between one terminal of said source and said multivibrator means and with its emitter-base circuit to an intermediate point of said voltage divider for remaining conductive only as long as the current flow through the circuit entering said lamp means remains in a predetermined normal range, but interrupting said circuit means when said current flow across said circuit increases beyond a predetermined maximum.

4. Blinking light arrangement, particularly for turn indicators on motor vehicles, comprising, in combination, at least two groups of electric lamp means; circuit means connected between a source of electric energy and said groups of lamp means and comprising switch means for alternatively energizing any one of said groups of lamp means, said circuit means further including control transistor means changeable between conductive and non-conductive condition for closing and interrupting the current supply to said lamp means depending upon said conditions; astable multivibrator means connected with said circuit means and cooperating with said control transistor means for periodically changing the latter between said conductive and non-conductive conditions; and protective transistor means connected in said circuit means with its emitter-collector circuit between one terminal of said source and said multivibrator means and with its emitter-base circuit in parallel with said groups of lamp means for remaining conductive only as long as the current flow through the circuit entering said lamp means remains in a predetermined normal range, but interrupting said circuit means when said current flow across said circuit increases beyond a predetermined maximum.

5. Blinking light arrangement, particularly for turn indicators on motor vehicles, comprising, in combination, at least two groups of electric lamp means; circuit means connected between a source of electric energy and said groups of lamp means and comprising switch means for alternatively energizing any one of said groups of lamp means, said circuit means further including control transistor means changeable between conductive and non-conductive condition for closing and interrupting the current supply to said lamp means depending upon said conditions, and voltage divider means connected in parallel with said groups of lamp means; astable multivibrator means connected with said circuit means and cooperating with said control transistor means for periodically changing the latter between said conductive and non-conductive conditions; and protective transistor means connected in said circuit means with its emitter-collector circuit between one terminal of said course and said multivibrator means and with its emitter-base circuit to an intermediate point of said voltage divider for remaining conductive only as long as the current flow through the circuit entering said lamp means remains in a predetermined normal range, but interrupting said circuit means when said current flow across said circuit increases beyond a predetermined maximum.

References Cited by the Examiner
UNITED STATES PATENTS

| | | | |
|---|---|---|---|
| 2,891,195 | 6/1959 | Smyth | 307—88.5 |
| 2,949,548 | 8/1960 | Wiseman | 307—88.5 |
| 2,994,013 | 7/1961 | Skellet | 307—88.5 |
| 3,122,646 | 2/1964 | Deysher et al. | 307—88.5 |
| 3,217,207 | 11/1965 | Webb | 317—15 |

JAMES W. LAWRENCE, *Primary Examiner.*

C. R. CAMPBELL, *Assistant Examiner.*